Jan. 6, 1959  K. M. SNIDER  2,867,463
PACKING MEMBERS FOR PIPE JOINTS AND THE LIKE
Filed March 21, 1955  3 Sheets-Sheet 1

INVENTOR
Kenneth M. Snider

BY Lancaster, Allwine Rommel
ATTORNEYS

Jan. 6, 1959  K. M. SNIDER  2,867,463
PACKING MEMBERS FOR PIPE JOINTS AND THE LIKE
Filed March 21, 1955  3 Sheets-Sheet 2

INVENTOR
Kenneth M. Snider

BY
ATTORNEYS

Jan. 6, 1959 K. M. SNIDER 2,867,463
PACKING MEMBERS FOR PIPE JOINTS AND THE LIKE
Filed March 21, 1955 3 Sheets-Sheet 3
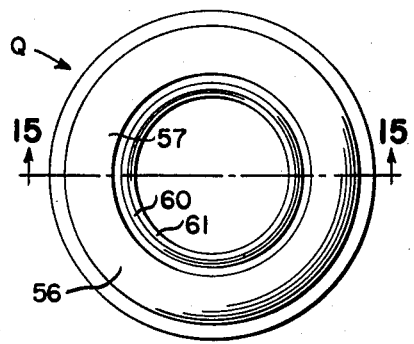
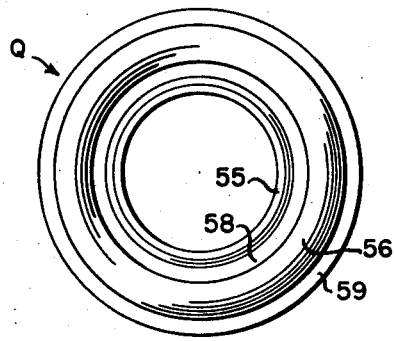
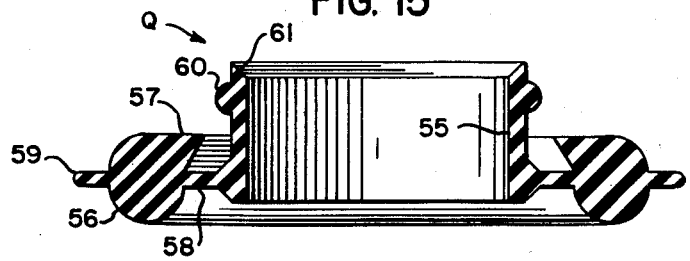
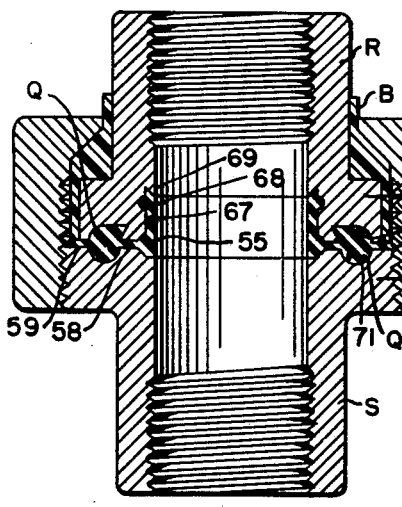
INVENTOR
Kenneth M. Snider
BY Lancaster, Allwine Rommel
ATTORNEYS United States Patent Office 2,867,463
Patented Jan. 6, 1959

2,867,463

PACKING MEMBERS FOR PIPE JOINTS AND THE LIKE

Kenneth M. Snider, Mansfield, Ohio, assignor to The American Coupler Company, Cleveland, Ohio, a corporation of Ohio Application March 21, 1955, Serial No. 495,596

1 Claim. (Cl. 288—19)

This invention relates to joint packing and more specifically to packing members for the packing of pipe joints and the like.

An important object of the invention is to provide packings of dielectric material to provide both packing and electrical insulation between two metallic conduits or the like. Such packings are of especial value, for example, to prevent electrolytic action taking place between two adjoining conduits of dissimilar metals, carrying a fluid, and which action would tend to corrode one of the conduits.

Another important object is to provide packings of dielectric material to provide both packing and electrical insulation between two metallic conduits or the like. Such packings are of especial value, for example, to prevent electrolytic action taking place between two adjoining conduits of dissimilar metals, carrying a pressure fluid, and which action would tend to corrode one of the conduits.

Still another important object is to provide packings of dielectric material to provide both packing and electrical insulation between two metallic conduits or the like. Such packings are of especial value, for example, to prevent electrolytic action taking place between two adjoining conduits of dissimilar metals, in which a vacuum exists, and which action would tend to corrode one of the conduits.

Other objects and advantages of the invention will be apparent during the course of the following detailed description of the invention, taken in connection with the accompanying drawings, forming parts of this disclosure and in which drawings:

Fig. 13 is a top plan of a third form of the members of Figs. 1, 2, 7 and 8 to 11 inclusive.

Fig. 14 is a bottom plan thereof.

Fig. 15 is a vertical section thereof on an enlarged scale, substantially on the line 15—15 of Fig. 13.

Fig. 16 is a vertical section illustrating application of the member of Figs. 13, 14 and 15 to a pressure line.

Fig. 17 is a vertical section illustrating application of this member to a vacuum line.

Figure 1:
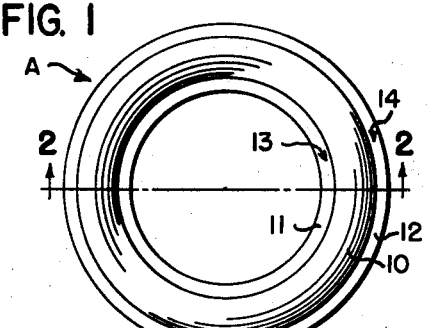
Fig. 1 is a plan of one of the packing members.

In the drawings, wherein for the purpose of illustration are shown three major embodiments of the invention and wherein similar reference characters designate corresponding parts throughout the several views the letter A designates a packing member or gasket; B, another packing member which is preferably common to all forms of the invention; C, D and E, two conduits and a coupling of one conduit line; G and H, two conduits of another line; K, a coupling for the conduits G and H; L, another packing member or gasket; M and N, two conduits of another conduit line; P, a coupling for association therewith; Q, another packing member or gasket; R, S and T, two conduits and a coupling for association therewith; U, another packing member or gasket; V and W, two conduits; and X, a coupling for association therewith.

Figure 7:
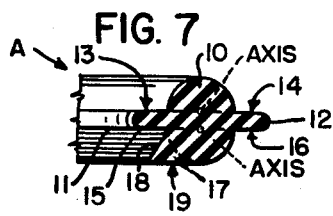
Fig. 7 is an enlarged fragmentary vertical section of the member of Fig. 2.
Figure 8:
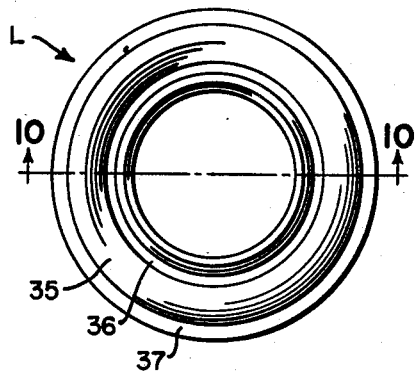
Fig. 8 is a top plan of another form of the member of Figs. 1, 2 and 7.
Figure 9:
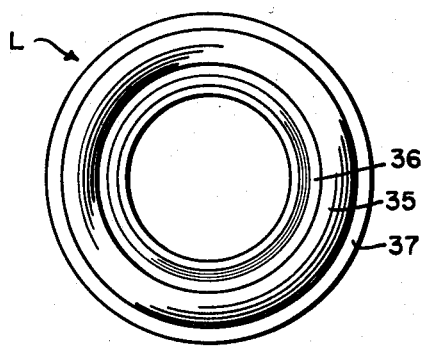
Fig. 9 is a bottom plan thereof.
Figure 10:
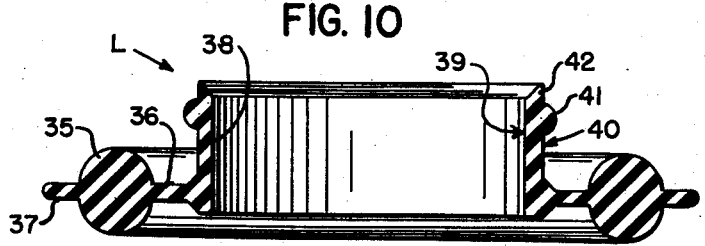
Fig. 10 is a vertical section thereof on an enlarged scale, substantially on the line 10—10 of Fig. 8.
Figure 12:
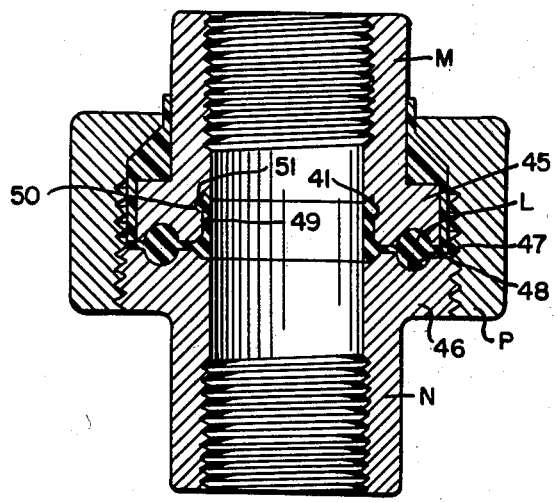
Fig. 12 is a vertical section illustrating application of the members of Figs. 8 to 11 inclusive in a fluid line.
Figure 11:
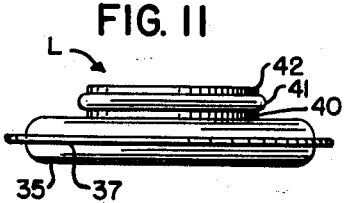
Fig. 11 is an elevation thereof on a scale reduced over that of Fig. 10.

The packing members or gaskets A, Q and U are deviated O-ring gaskets, and each have some of the characteristics of the deviated O-ring gaskets of my co-pending application for patent, Serial No. 425,077, now abandoned, filed April 23, 1954, for Coupling Parts for Tank and Pipe Couplings and the Like, in that the body portions of the members A, Q and U are curved, as are the body portions of the deviated O-ring gaskets referred to in this co-pending application, and have wedges somewhat like those described in said co-pending application, but member A is provided with an inner peripheral flange 11 and outer peripheral flange 12, with the flanges preferably integral with the annular central part of the body portion 10. The body portion 10 differs from the body portions of the gaskets of said co-pending application in that the transverse cross section of the body portion 10 is defined by two arcs of substantially 180° each with the axis of one intersecting the plane of one like face (i. e., the faces 13 and 14) of the flanges 11 and 12 and the axis of the other intersecting the plane of the other like face (i. e., the faces 15 and 16) of the flanges 11 and 12, all as best shown in Fig. 7, whereby two annular outer body parts are provided and these outer body parts extend from the central part. Extending outwardly from the body portion 10 is an annular wedge portion 17 one face 18 of which preferably extends from the base of the flange 11 to a sharp edge at the plane of the edge of the body portion and the plane of the other face 19 coincides with the first-mentioned plane. The packing member or gasket A may be of any suitable resilient material, having good dielectric properties. It may be one of the chloroprene rubbers, as neoprene of E. I. du Pont de Nemours & Co., Inc., Wilmington, Delaware.

Figure 3:
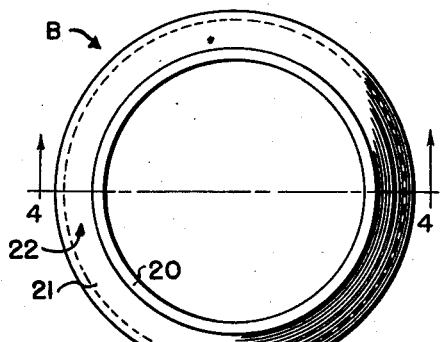
Fig. 3 is a plan of the other of the packing members.
Figure 2:
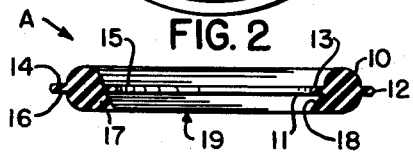
Fig. 2 is a vertical section thereof substantially on the line 2—2 of Fig. 1.
Figure 4:
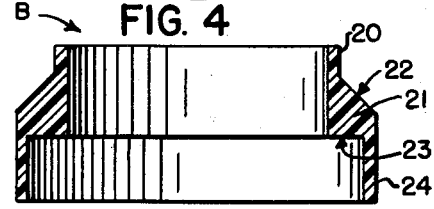
Fig. 4 is a vertical section of the member of Fig. 3 substantially on the line 4—4 of Fig. 3.

The packing member B, shown particularly in Figs. 3 and 4 but which may be employed with all forms of the invention, is a sleeve-like body, which is preferably of rigid dielectric material, such as a laminated phenolic resin. An example of such is Formica of the Formica Co., Inc., of Cincinnati, Ohio. This sleeve comprises an outer cylindrical portion 20, an annular shoulder portion 21 which provides an outwardly-facing bevelled annular shoulder 22 and an inwardly-facing flat annular shoulder 23. From the portion 21 depends a skirt portion 24 of greater diameter than that of the portion 20.

Figure 5:
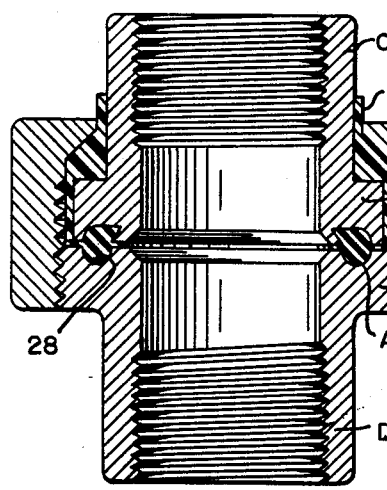
Fig. 5 is a vertical section illustrating application of the packing member in a pressure line.

Fig. 5 illustrates use of the members A and B in a pressure line which includes the conduits C and D, each having a flanged end 25 and 26 respectively, with the flanges recessed to accommodate the body portion 10 and wedge portion 17 substantially as shown in Fig. 5 where the annular recess 27 in the flanged end 25 accommodates the wedge portion and a part, having 180° of arc, of the body portion 10, and the annular recess 28 in the flanged end 26 accommodates the other part of the body portion 10 having 180° of arc. The flanges 11 and 12 are disposed upon the recessed faces of the flanged ends.

The portion of member A is inserted first into the recess 27, the two conduits then disposed as in Fig. 5 the member B slipped into position with the end of the swirt portion 24 disposed upon the outer end portion of the flange 11, and the interiorly screw threaded E coupling, which may be of conventional construction, applied and screwed tightly, employed in the exterior screw threads of the flange end 26, so as to effect the wedging action described in my co-pending application referred to above.

It will be noted in Fig. 5 that the conduits C and D are now electrically insulated one from the other.

Figure 6:
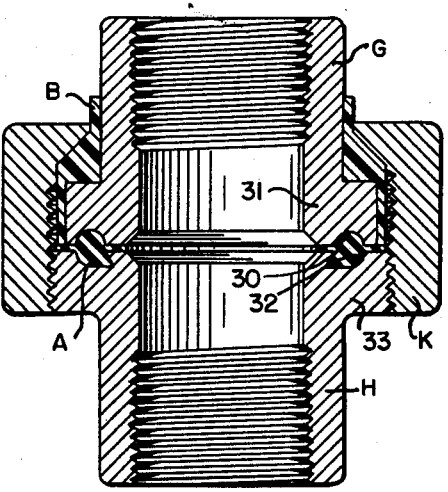
Fig. 6 is a vertical section illustrating application of the packing members in a vacuum line.

Fig. 6 illustrates the packing member or gasket A applicable to a vacuum line. Therein the member A is turned over and the recess 30 in the flanged end 31 of the conduit G receives the wedgeless part of the member A while the recess 32 in the flanged end 33 of the conduit H receives the wedged part of the member A. Otherwise, application of the members A and B and the coupling K are the same as described for the showing in Fig. 5.

Referring now to the packing or gasket member L of Figs. 8 to 12 inclusive, this member includes a body portion 35 and flanges 36 and 37 preferably exactly like the body portion 10 and flanges 11 and 12 but there is no wedge portion. However, the inner flange 36 carries a sleeve 38, preferably integral therewith and preferably disposed at its peripheral portion with its axis substantially normal to the axis of the flange 36. This sleeve 38 has a preferably smooth inner peripheral surface 39 and an outer peripheral surface 40 provided with means to assist in retaining it securedly in a recess 49 in the conduit M to be subsequently described. The means includes an outwardly extending annular bead 41 and a wedge 42 at its free end.

Each flanged end 45 and 46 of the conduits M and N respectively has a substantially like annular recess 47 and 48 respectively to accommodate the body portion 35 and the flanged end 45 has an annular recess 49 to snugly accommodate the sleeve 38, since it includes an annular groove 50 to accommodate the bead 40 and a wedge-shaped groove 51 to accommodate the wedge 41.

The member L is initially slipped into position upon the flanged end 45, the member B positioned as heretofore, and the conduits M and N coupled by the coupling P. By the use of the member L arcing is wholly prevented at the inner faces of the conduits at the juncture of these conduits and flow of electric current from one coupling to the other also prevented.

Referring now to Figs. 13 to 16 inclusive, the packing member or gasket Q is preferably exactly like the member A but with the addition of a sleeve 55 preferably exactly like the sleeve 38. The body portion 56 carries a wedge portion 57, preferably like the wedge portion 17, and flanges 58 and 59 preferably like the flanges 11 and 12 or 36 and 37, with the sleeve 55 extending from the flange 58 as the sleeve 38 extends from the flange 36.

The flanged end 65 of the conduit R has a recess 66 preferably like the recess 27, and an annular recess 67 preferably like the recess 49, to accommodate the sleeve 55. This recess 66 has an annular groove 68 to accommodate the bead 60 of the sleeve 55 and a wedge-shaped groove 69 to accommodate the wedge 61 at the free end of the sleeve 55. The flanged end 70 of the conduit S has an annular recess 71 to accommodate a part of the body portion 56 as does the recess 28.

The member Q is applied by combining the steps to apply the members A and L, applying the member B, and the two conduits connected by means of the coupling T. The showing in Fig. 16 is for use of the member Q in a pressure line.

In Fig. 17 is shown a packing member or gasket U for employment in a vacuum line. This member U embodies features of the member A as employed in Fig. 6 but including a sleeve 75 extending from the flange 76 which extends from the body portion 77. There is, of course, the opposite flange 78 and the wedge portion 79 is disposed as is the wedge portion 17 of Fig. 6.

There are shown, in Fig. 17, two conduits V and W, with the former provided with a flanged end 85 having a recess 86 preferably substantially similar to the recess 30 and an annular recess 87 substantially like the recess 67, to accommodate the sleeve 75. The conduit W has a flanged end 87' with a recess 88 substantially like the recess 32.

It is believed clear that the member U is positioned on the flanged end 87' by a combination of the movements necessary to position the body portion 10 of the member A upon the flanged end 33 of the conduit H and the sleeve 55 upon the flanged end 65 of the conduit R.

Each form of the invention embodied in the members A, L, Q and U, includes preferably a circular body portion in which the transverse cross section thereof is defined by two arcs, with their axes spaced apart a distance substantially equal to the thickness of the flanges extending from the body portions. Each form also includes two annular flanges extending from the body portion one an inward flange and the other an outward flange, with one like face of each flange substantially 180° apart and the other like face of each flange substantially 180° apart. The members A, Q and U include the wedge portions 17, 57 and 79 respectively, and the members L, Q and U are provided with the sleeves 38, 55 and 75 respectively.

The specific shape of all the body portions, exclusive of the wedge portions of three of them, provides a positive seal for fluid which is not characteristic of gaskets having body portions circular or substantially circular in transverse section, since there is better and more positive compression of the body portion. The flanges of all forms aid in providing this positive seal. The outermost flange, of course, is abutted by the free end edge of the skirt 24 of the member B and is compressed thereby to aid in sealing. The functions of the wedge portions 17, 57 and 79 are fully brought out in my co-pending application referred to above, but the wedge portions 17, 57 and 79 of this present disclosure cooperate with the flanges 13, 58 and 76 to effect a more positive seal than do wedges disassociated with flanges like those just mentioned. The flanges tend to force the wedges more firmly into their recesses. As for the recessed sleeves, integral with the innermost flanges, the function thereof is explained above.

Various changes may be made to the forms of the invention shown and described without departing from the spirit of the invention or scope of the claim.

What is claimed is:

As an article of manufacture, a gasket for partial recessing in the adjoining end portions of two tubular members, said gasket having an integral body portion comprising a first annular outer part, a second annular outer part and an annular central part between the outer parts, and two annular flanges integral with and extending outwardly from the central part, each of said flanges having opposite faces in substantial parallelism, said body portion having a transverse cross section in which the surface of one of said outer parts is defined by an arc of a circle of which the axis thereof intersects the plane of one like face of each flange and terminates at said one like face of each flange, the other of said outer parts being provided with a wedge portion with one face of the wedge portion extending to the other like face of one of said flanges, and the transverse cross section of said other outer part exhibiting an arcuate outer surface defined by an arc of a circle the axis of which intersects the planes of the others of said opposite faces, the last-named arc being of substantially 90° and the other face of said wedge portion extending to one end of said arcuate outer surface of the other outer part.

References Cited in the file of this patent

UNITED STATES PATENTS

| Number | Name | Date |
|---|---|---|
| 493,883 | Ballet | Mar. 21, 1893 |
| 834,618 | Herrick | Oct. 30, 1906 |
| 1,783,410 | Cowell | Dec. 2, 1930 |
| 2,102,673 | Brown | Dec. 21, 1937 |
| 2,403,364 | Hertzell et al. | July 2, 1946 |
| 2,688,500 | Scott | Sept. 7, 1954 |